(12) United States Patent
Konkle (10) Patent No.: US 8,511,893 B2
(45) Date of Patent: Aug. 20, 2013

(54) PACKAGING FOR A RADIOLOGICAL DEVICE

(75) Inventor: Nicholas Konkle, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 485 days.

(21) Appl. No.: 12/276,264

(22) Filed: Nov. 21, 2008

(65) Prior Publication Data

US 2010/0128850 A1    May 27, 2010

(51) Int. Cl.
*H01J 31/49*    (2006.01)
(52) U.S. Cl.
USPC ........................................... 378/189; 378/188
(58) Field of Classification Search
USPC ................. 378/189, 169, 172, 173, 174, 175, 378/182, 184, 185, 186, 187, 188
See application file for complete search history.

(56) References Cited

U.S. PATENT DOCUMENTS

| | | | | |
|---|---|---|---|---|
| 3,511,990 | A | * | 5/1970 | Hauss ........................... 378/187 |
| 4,961,502 | A | * | 10/1990 | Griffiths ........................ 206/455 |
| 5,912,944 | A | * | 6/1999 | Budinski et al. .............. 378/182 |
| 6,700,126 | B2 | | 3/2004 | Watanabe |
| 6,926,441 | B2 | * | 8/2005 | Stout, Jr. ........................ 378/177 |
| 2006/0071172 | A1 | | 4/2006 | Ertel et al. |
| 2007/0272873 | A1 | | 11/2007 | Jadrich et al. |
| 2008/0078939 | A1 | | 4/2008 | Hennessy |

* cited by examiner

*Primary Examiner* — Hoon Song (57) ABSTRACT

Systems, methods and apparatus are provided through which in some implementations a cover sheet and a frame of a X-ray imaging detector are attached through interlocking apparatus that provides a strong attachment between the cover sheet and the X-ray imaging detector frame and that also reduces the complexity of the attachment and reduces the number of fasteners required between the cover sheet and the X-ray imaging detector frame.

17 Claims, 6 Drawing Sheets

PACKAGING FOR A RADIOLOGICAL DEVICE

FIELD

This invention relates generally to X-ray imaging detectors and more particularly to X-ray imaging detector cover assemblies.

BACKGROUND

X-ray imaging has long been an accepted medical radiological diagnostic tool. X-ray imaging systems are commonly used to capture, as examples, thoracic, cervical, spinal, cranial, and abdominal images that often include information necessary for a doctor to make an accurate diagnosis. X-ray imaging systems typically include an X-ray source. X-rays produced by a source travel through the patient, and the X-ray sensor then detects the X-ray energy generated by the source and attenuated to various degrees by different parts of the body.

The X-ray sensor may be a conventional screen/film configuration, in which the screen converts the X-rays to light that exposes the film. The X-ray sensor may also be a solid state digital image detector.

One implementation of a solid state digital X-ray detector is comprised of an array of semiconductor field-effect transistors (FETs) and photodiodes. Each pair of photodiodes and FETs receives a pixel of photo data. Portable digital X-ray detectors include an X-ray imaging device. The X-ray imaging device includes a pixel array that captures X-ray electromagnetic energy and converts the X-ray electromagnetic energy to electrical signals.

The pixel arrays are delicate and susceptible to damage. The possible financial burden to the owner of the X-ray sensor is great because of the delicate nature of the pixel arrays and the large cost of the solid state digital X-ray detector and in particular the large cost of the pixel arrays.

Because of the financial motivation to protect the solid state digital X-ray detectors, enclosures are often used to package and protect the solid state digital X-ray detectors. An enclosure physically encompasses most if not all of a solid state digital X-ray detector. The enclosure provides physical protection to a solid state digital X-ray detector that is inside of the enclosure.

BRIEF DESCRIPTION

The above-mentioned shortcomings, disadvantages and problems are addressed herein, which will be understood by reading and studying the following specification.

In one aspect, an apparatus to contain and protect an X-ray imaging detector includes an X-ray imaging detector frame having a groove and a cover sheet, the cover sheet having two faces and four sides. One of the sides of each of the sheets are placed or inserted in the groove of the X-ray imaging detector frame. In a further aspect, both of the faces of the cover sheet are attached to the X-ray imaging detector frame. Attaching the cover sheet to the X-ray imaging detector frame through both faces of the cover sheet provides a strong attachment between the cover sheet and the X-ray imaging detector frame that reduces the complexity of the attachment and reduces the number of fasteners required between the cover sheet and the X-ray imaging detector frame.

In another aspect, an apparatus to contain and protect an X-ray imaging detector includes an X-ray imaging detector frame and a cover sheet having two opposing faces, in which the two opposing faces of the cover sheet are attached to the X-ray imaging detector frame.

In still another aspect, the apparatus includes padding over the cover sheet, in which case the apparatus looks more rugged, feels more comfortable to a patient, and absorbs shock loads with a lighter frame.

In yet another aspect, an X-ray imaging detector cover assembly includes an X-ray imaging detector frame having four portions that form a right-angled quadrilateral geometry, the inner perimeter of at least two of the four portions having two parallel grooves, the grooves having a width. The X-ray imaging detector cover assembly also includes two cover sheets, each cover sheet having two faces and four sides, the cover sheets having a thickness about equal to the width of the grooves, each of the cover sheets being attached to the X-ray imaging detector frame in one of the grooves of the X-ray imaging detector frame, wherein the two cover sheets are spaced apart from each other at a distance about the thickness of an X-ray imaging detector.

Apparatus, systems, and methods of varying scope are described herein. In addition to the aspects and advantages described in this summary, further aspects and advantages will become apparent by reference to the drawings and by reading the detailed description that follows.

DETAILED DESCRIPTION

In the following detailed description, reference is made to the accompanying drawings that form a part hereof, and in which is shown by way of illustration specific implementations which may be practiced. These implementations are described in sufficient detail to enable those skilled in the art to practice the implementations, and it is to be understood that other implementations may be utilized and that logical, mechanical, electrical and other changes may be made without departing from the scope of the implementations. The following detailed description is, therefore, not to be taken in a limiting sense.

The detailed description is divided into three sections. In the first section, apparatus of implementations are described. In the second section, implementations of methods are described. Finally, in the third section, a conclusion of the detailed description is provided.

Apparatus Implementations

In this section, particular apparatus are described by reference to a series of diagrams.

Figure 1:
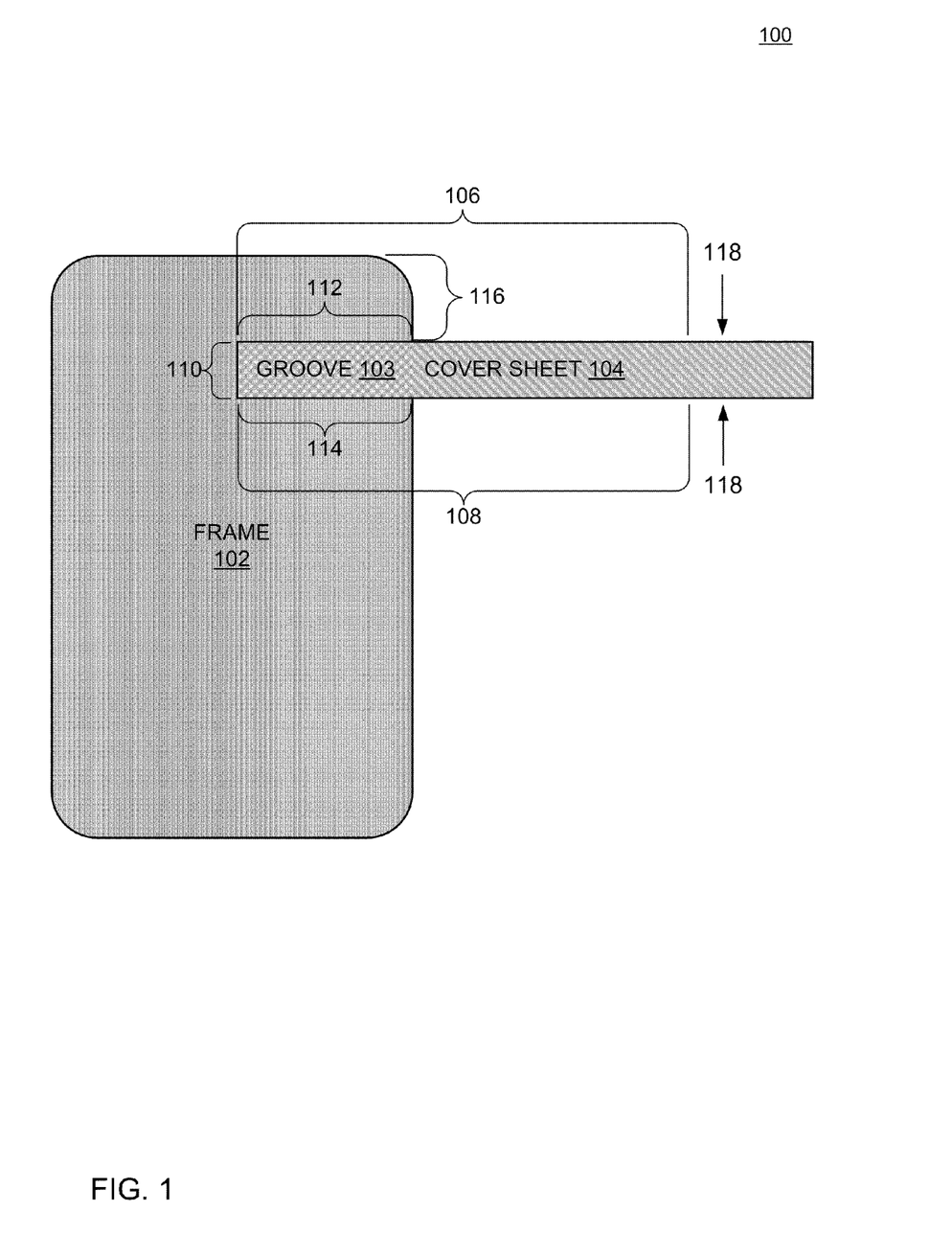
FIG. 1 is a cross section block diagram of apparatus in which a cover sheet is attached to a groove of X-ray imaging detector frame through two sides of the cover sheet, according to an implementation.

FIG. 1 is a cross section block diagram of apparatus 100 in which a cover sheet is attached to a groove of X-ray imaging detector frame through two sides of the cover sheet, according to an implementation. Apparatus 100 interlocks the cover sheet to the X-ray imaging detector frame.

Apparatus 100 includes an X-ray imaging detector frame 102. The X-ray imaging detector frame 102 has one or more groove(s) 103. Each groove 103 is a recessed area of the X-ray imaging detector frame 102.

Figure 4:
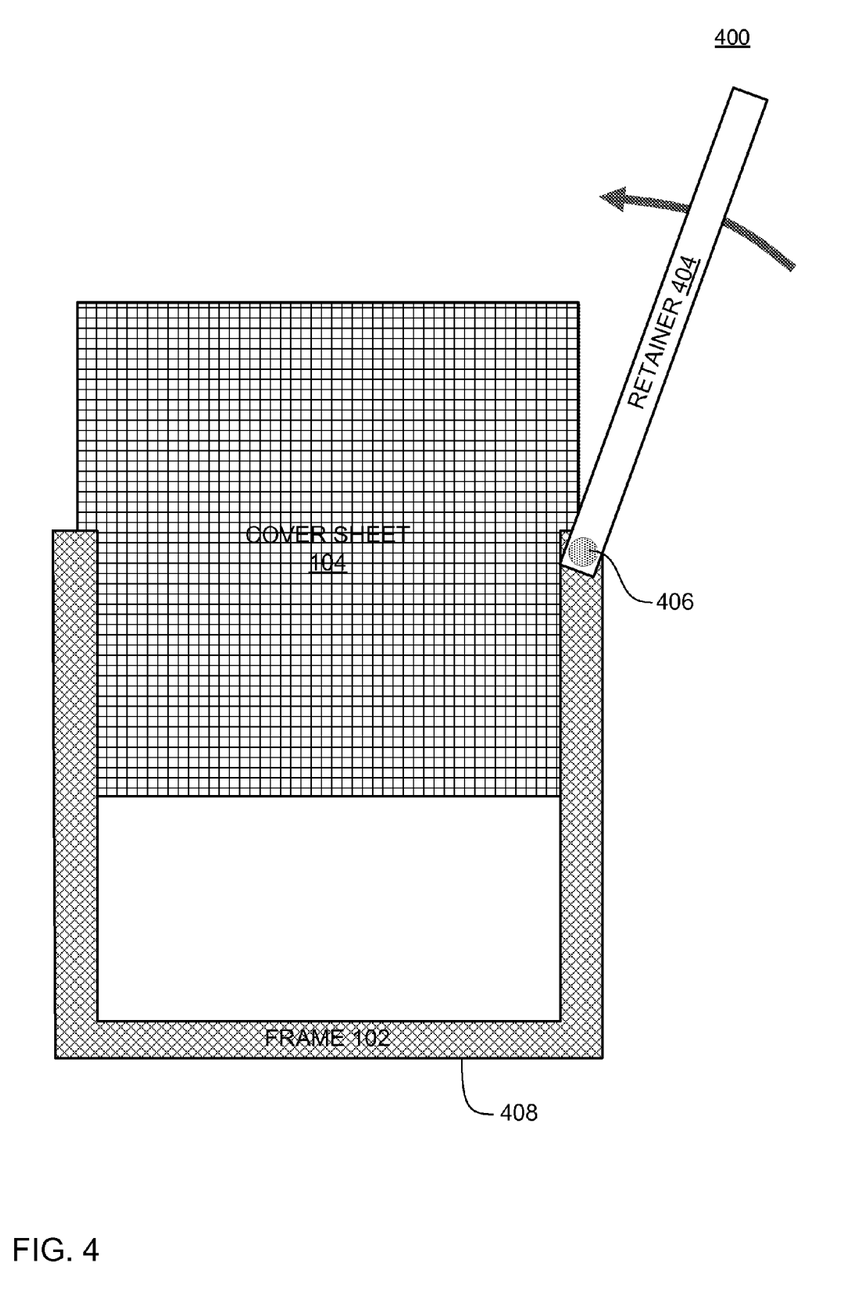
FIG. 4 is a block diagram of apparatus to package an X-ray imaging detector being assembled.
Figure 5:
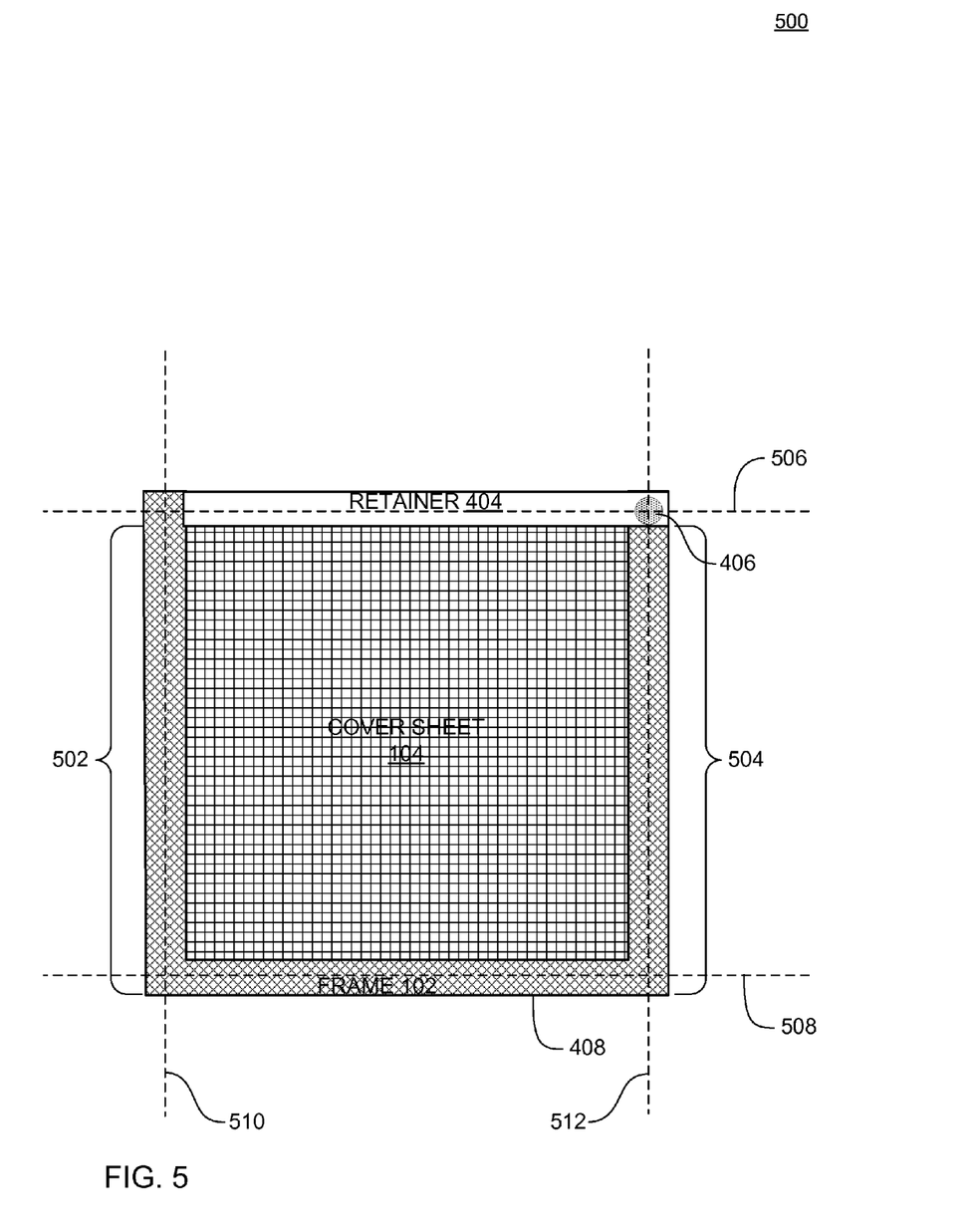
FIG. 5 is a block diagram of a fully assembled apparatus to package an X-ray imaging detector.

Apparatus 100 also includes one or more cover sheets 104. The one or more cover sheets 104 have opposing two faces 106 and 108. The cover sheet(s) 104 also have four sides, one of the sides is shown as side 110 and the other three sides are shown in FIG. 4 and FIG. 5.

Both of the faces 106 and 108 of each of the cover sheet(s) 104 are placed or inserted in the groove(s) 103 of the X-ray imaging detector frame. Face 106 is placed along portion 112 of the face 106 of the cover sheet(s) 104 that is inside a groove 103. Face 108 is placed along portion 114 of the face 108 of the cover sheet(s) 104 that is inside the groove 103.

In some implementations, the cover sheet(s) 104 are placed in the groove(s) 103 wherein one of the sides of each of the at least one cover sheet(s) 104 are placed in the groove(s) 103 of the X-ray imaging detector frame 102. Attachment of the cover sheet(s) 104 to the X-ray imaging detector frame 102 through two faces 106 and 108 of the cover sheet(s) 104 provides an interlocking attachment between the X-ray imaging detector frame 102 and the cover sheet(s) 104. Thus, the attachment of the cover sheet(s) 104 to the X-ray imaging detector frame 102 is simplified without requiring many if any fasteners between the X-ray imaging detector frame 102 and the cover sheet(s) 104. Furthermore, manufacturing the apparatus 100 is also simplified because of the interlocking attachment between the X-ray imaging detector frame 102 and the cover sheet(s) 104, as described in FIG. 6.

Please note that the groove 103 has 3 sides that are internal to the X-ray imaging detector frame 102, which provides an overhang 116 or lip of the X-ray imaging detector frame 104 over the cover sheet(s) 104. The overhang 116 physically protects the cover sheet(s) 104 from damage in collisions.

In some implementations, the cover sheet(s) 104 is attached to the frame with adhesive. In some implementations, the cover sheet(s) 104 is attached to the frame with fasteners (not shown). Having both faces 106 and 108 of each cover sheet(s) 104 being attached to the X-ray imaging detector frame 102 provides a high degree of resistance to detachment of each cover sheet 104 from the X-ray imaging detector frame 102. Thus, the attachment between the X-ray imaging detector frame 102 and the cover sheet(s) 104 is strong and reliable.

In regards to the fit between the cover sheet(s) 104 and the X-ray imaging detector frame 102 in the groove 103, the sheet(s) 104 have a thickness 118. In some implementations, the thickness 118 of the cover sheet(s) 104 is about equal to a width of the groove 103 of the X-ray imaging detector frame 102. The width of the groove 103 of the X-ray imaging detector frame 104 and the thickness 118 of the sheets being about the same provides for a tight fit between the X-ray imaging detector frame 102 and the cover sheet(s) 104.

In some implementations, the side 110 of the cover sheet 104 that is inside the groove 103 of the X-ray imaging detector frame 102 is attached to the X-ray imaging detector frame 102. The attachment of the side 110 of the cover sheet(s) 104 to the X-ray imaging detector frame 102 improves and strengthens resistance to detachment of each cover sheet 104 from the X-ray imaging detector frame 102.

In some implementations, the X-ray imaging detector frame 102 is made of a resilient material that helps to protect an X-ray imaging detector that is enclosed in the apparatus 100. In some implementations, the X-ray imaging detector frame 102 includes acrylonitrile butadiene styrene (ABS plastic), which provides durability and shock absorption at a low-cost. In some implementations, the cover sheet(s) 104 are manufactured from a composite material, such as carbon-fiber-reinforced-plastic, in which case, the cover sheet(s) 104 and the X-ray imaging detector frame 102 are made of materials that are different from each other. Having cover sheet(s) 104 and X-ray imaging detector frame 102 manufactured of different materials provides the benefit of increased stiffness and X-ray transparency of the cover sheets while simultaneously achieving optimal ruggedness on the corners. The composite cover sheet(s) 104 is also a lightweight material that reduces the total weight of the apparatus 100, which makes for an apparatus that is easier to move and handle.

In some implementations, the X-ray imaging detector frame 102 is made of a material that is less stiff and more energy-dissipative than the material of the cover sheet(s) 104. A X-ray imaging detector frame 102 that is manufactured of materials that are softer than the cover sheet(s) 104 causes a great portion of shock from collisions and falls to be absorbed by the X-ray imaging detector frame 102.

The dimensions and relative proportions of the X-ray imaging detector frame 102, the cover sheet(s) 104, portion 112 of face 106, portion 114 of face 108, and side 110 shown in the figures are merely illustrative. Other implementations can have different dimensions and relative proportions of the X-ray imaging detector frame 102, the cover sheet(s) 104, portion 112 of face 106, portion 114 of face 108, and side 110 than the dimensions and relative proportions shown in the figures. While the apparatus 100 is not limited to any particular X-ray imaging detector frame 102, the cover sheet(s) 104, portion 112 of face 106, portion 114 of face 108, and side 110, for sake of clarity a simplified X-ray imaging detector frame 102, the cover sheet(s) 104, portion 112 of face 106, portion 114 of face 108, and a simplified side 110 are described.

Figure 2:
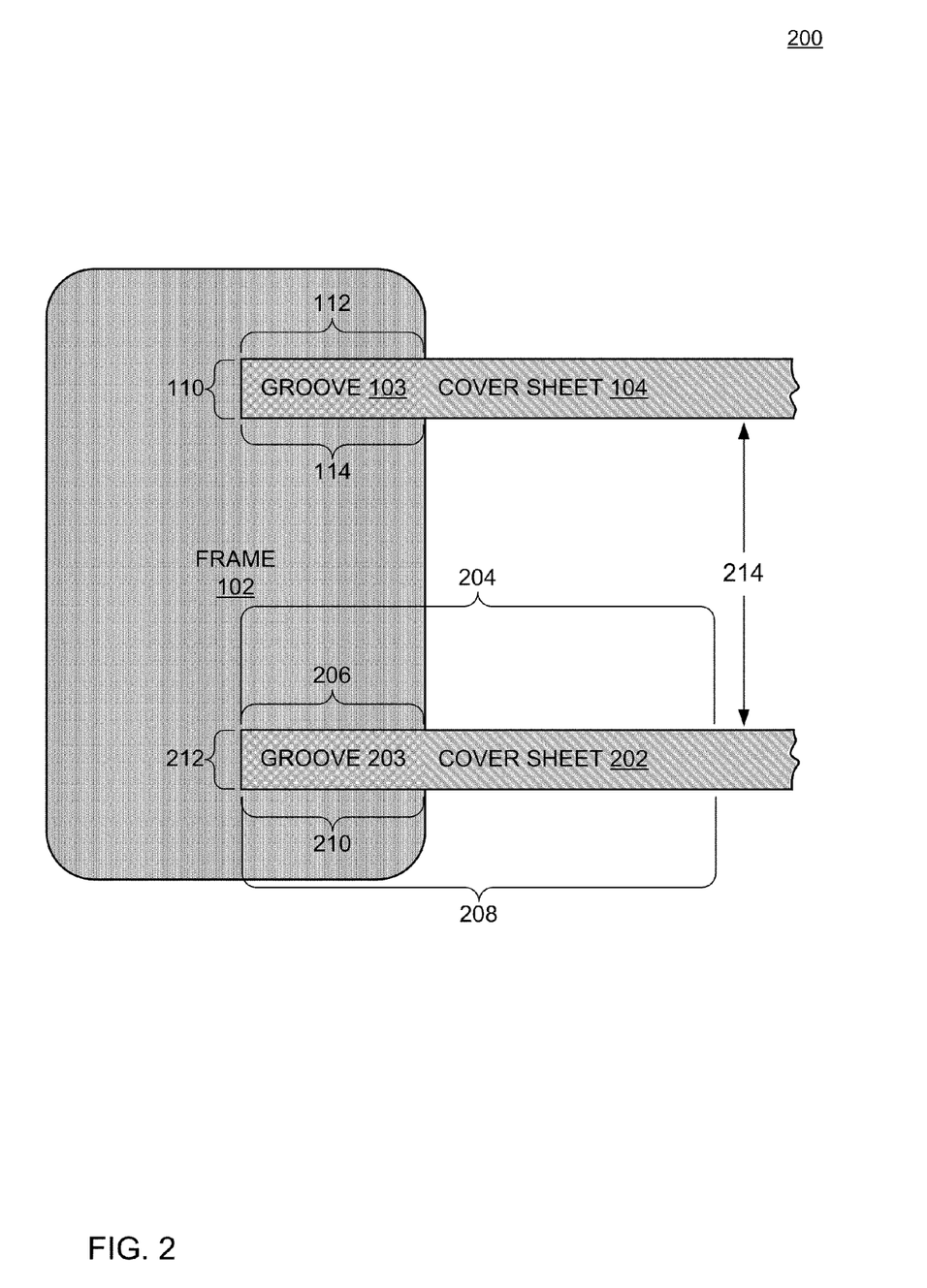
FIG. 2 is a cross section block diagram of apparatus in which cover sheets are attached to X-ray imaging detector through two sides of each cover sheet, according to an implementation.

FIG. 2 is a cross section block diagram of apparatus 200 in which cover sheets are attached to X-ray imaging detector through two sides of each cover sheet, according to an implementation. The two cover sheets protect an X-ray imaging detector on both front and back sides of the X-ray imaging detector.

Apparatus 200 includes two cover sheets 104 and 202. Both cover sheets 104 and 202 are attached to the X-ray imaging detector frame 102 in the same manner; each cover sheet is attached to the X-ray imaging detector frame 102 in a groove (e.g. 103) of the X-ray imaging detector frame 102. Similar to FIG. 1, a face 204 of the cover sheet 202 is attached to the X-ray imaging detector frame 102 along a portion 206 of the cover sheet 202 that is inside a second groove 203 of the X-ray imaging detector frame 102. The second groove 203 is a recessed area of the X-ray imaging detector frame 102 in which the cover sheet 202 is inserted into the X-ray imaging detector frame 102. Moreover, face 208 is attached to the X-ray imaging detector frame 102 along portion 210 of the face 208 of the cover sheet 202 that is inside the second groove 203. In some implementations, the cover sheet 202 is attached to the X-ray imaging detector frame with adhesive.

In some implementations, a side 212 of the cover sheet 202 that is inside the second groove 203 of the X-ray imaging detector frame 102 is attached to the X-ray imaging detector frame 102. The attachment of the side 212 of the cover sheet 202 to the X-ray imaging detector frame 102 improves and strengthens resistance to detachment of the cover sheet 202 from the X-ray imaging detector frame 102.

In some implementations, cover sheet 104 is made of the same material as cover sheet 202 and the two cover sheets 104 and 202 have the same thickness. In implementations in which the cover sheets 104 and 202 have the same thickness, both grooves 103 and 203 have a width about equal to the thickness of the each of two cover sheets 104 and 202.

The two cover sheets 104 and 202 are spaced apart from each other at a distance 214 that is about the thickness of an X-ray imaging detector (not shown). Thus, apparatus 200 accommodates, packages and protects from physical damage an X-ray imaging detector that is inside the apparatus 200.

Either of the two cover sheets 104 and 202 are often referred to as the "top" cover sheet and the other of the two cover sheets 104 and 202 is referred to as the "bottom" cover sheet.

Figure 3:
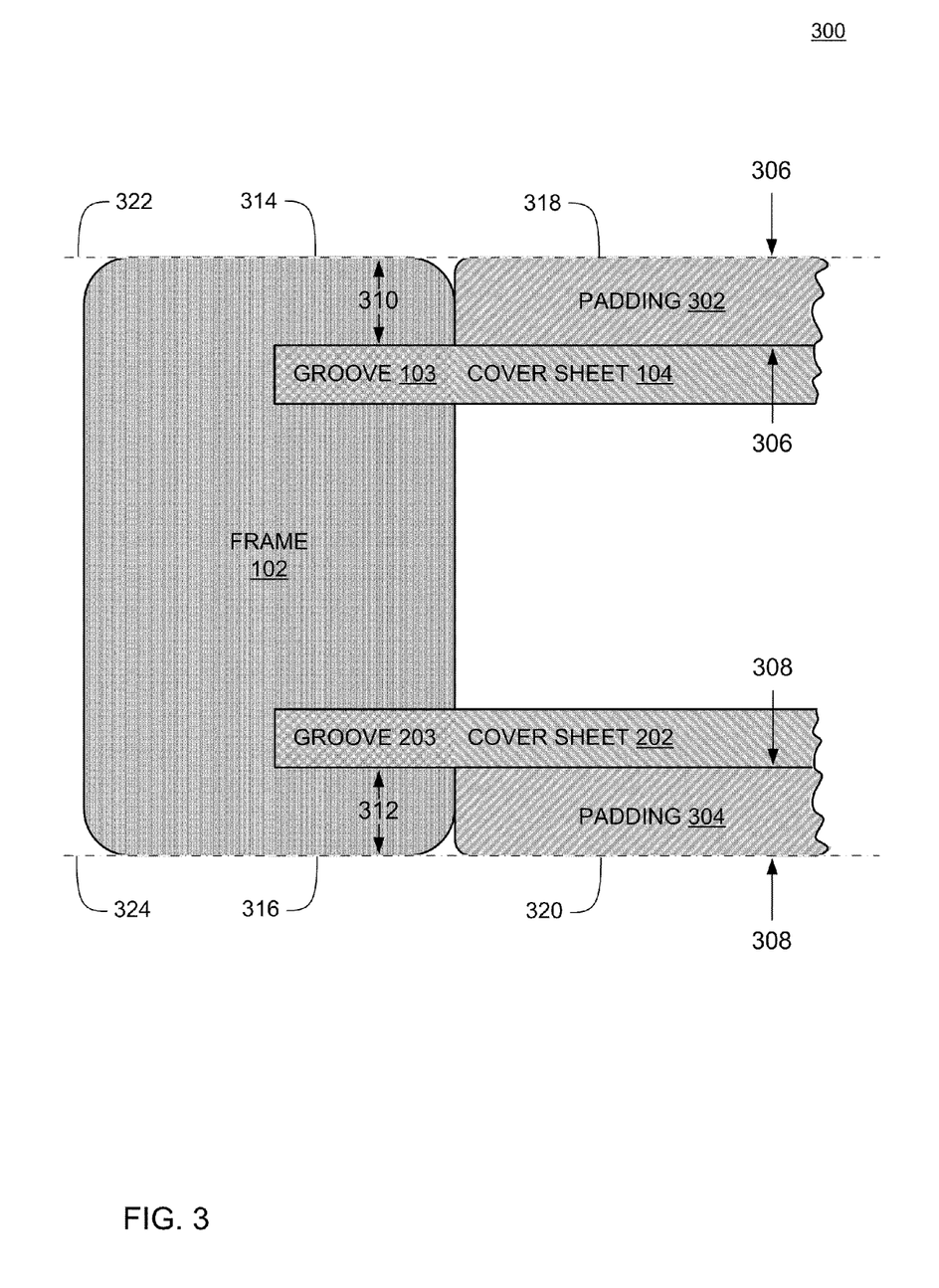
FIG. 3 is a cross section block diagram of apparatus to package an X-ray imaging detector, according to an implementation having padding on cover sheets.

FIG. 3 is a cross section block diagram of apparatus 300 to package an X-ray imaging detector, according to an implementation having padding on cover sheets. Apparatus 300 provides protection to an X-ray imaging detector.

In apparatus 300, padding 302 and 304 is attached to a face of the cover sheets 104 and 202. In the implementation shown in FIG. 3, the padding 302 and 304 is attached to outer faces 106 and 208 of the cover sheets 104 and 202, which provides protection from external shock. In the implementation shown in FIG. 3, the padding 302 and 304 has a thickness 306 and 308 that is about equal to a distance 310 and 312 that cover sheets 104 and 202 are positioned from outer edges 314 and 316 of the X-ray imaging detector frame 102. In that implementation, outer edges 318 and 320 of the padding 302 and 304 is about in a same plane 322 and 324 as the outer edges 314 and 316 of the X-ray imaging detector frame. The padding 302 and 304 provides shock absorption and physical protection in addition to the shock absorption and physical protection of the cover sheets 104 and 202. The padding 302 and 304 also provides thermal insulation to a patient from an X-ray imaging detector stored in the apparatus 300. The outer edges 318 and 320 of the padding 302 and 304 being about level with the outer edges 314 and 316 of the X-ray imaging detector frame 102 and having no substantial undulation, rise or variation is also more comfortable for a patient when the apparatus 300 is placed adjacent to the patient.

In some implementations, the padding 302 and 304 is permanently attached to the cover sheets 104 and 202, such as through the use of adhesive between the padding 302 and 304 and the cover sheets 104 and 202. In some implementations, the padding 302 and 304 is removably attached to the cover sheets 104 and 202, such as through the use of adhesive tape or hook-and-loop tape between the padding 302 and 304 and the cover sheets 104 and 202. Removeably attached padding 302 and 304 can be replaced with new padding 302 and 304, or the removeably attached padding 302 and 304 can be cleaned and again attached to the cover sheets 104 and 202. The padding 302 and 304 is also known as comfort padding.

FIG. 4 is a block diagram of apparatus 400 to package an X-ray imaging detector being assembled. Apparatus 400 provides protection to an X-ray imaging detector.

Apparatus includes an X-ray imaging detector frame 102. One or more cover sheet(s) 104 are inserted into grooves 103 and 203 in the X-ray imaging detector frame 102. A retainer 404 is rotably attached to the X-ray imaging detector frame 102 through a pin 406. The retainer 404 includes groove(s) 103 and 203 for each of the cover sheet(s) 104 that is aligned with the cover sheet 404 when each of the cover sheet(s) 104 are completely inserted in the X-ray imaging detector frame 102. The retainer 404 is also known as a swinging frame section. When cover sheet(s) 104 are fully inserted in the X-ray imaging detector frame 102, the retainer 404 can be rotated into a position that is parallel to portion 408 of the X-ray imaging detector frame 102, as shown in FIG. 5 below.

FIG. 5 is a block diagram of a fully assembled apparatus 500 to package an X-ray imaging detector. Apparatus 500 provides physical protection to an X-ray imaging detector.

In FIG. 5, the cover sheet(s) 104 are completely inserted into the grooves 103 and 203 of the X-ray imaging detector frame 102, and the retainer 404 is rotated into a shut or closed position. The retainer 404 is secured in the closed position by a fastener, latch or other mechanism that prevents the retainer 404 from being rotated into a position that is not closed.

The X-ray imaging detector frame 102 includes four portions 404, 408, 502 and 504 and that form a right-angled quadrilateral geometry when the retainer 404 is in the closed position, as shown in FIG. 5. The inner perimeter of at least two opposing portions of the four portions 404, 408, 502 and 504 have two parallel linear grooves 103 and 203 to hold the cover sheet 104 as shown in FIG. 3. Each of the four portions 404, 408, 502 and 504 of the X-ray imaging detector frame 102 have a geometrical axis, 506, 508, 510 and 512, respectively.

Method Implementations

In the previous section, apparatus of an implementation was described. In this section, the particular methods performed in the assembly and manufacturing of a cover assembly of an X-ray imaging detector are described by reference to a flowchart.

Figure 6:
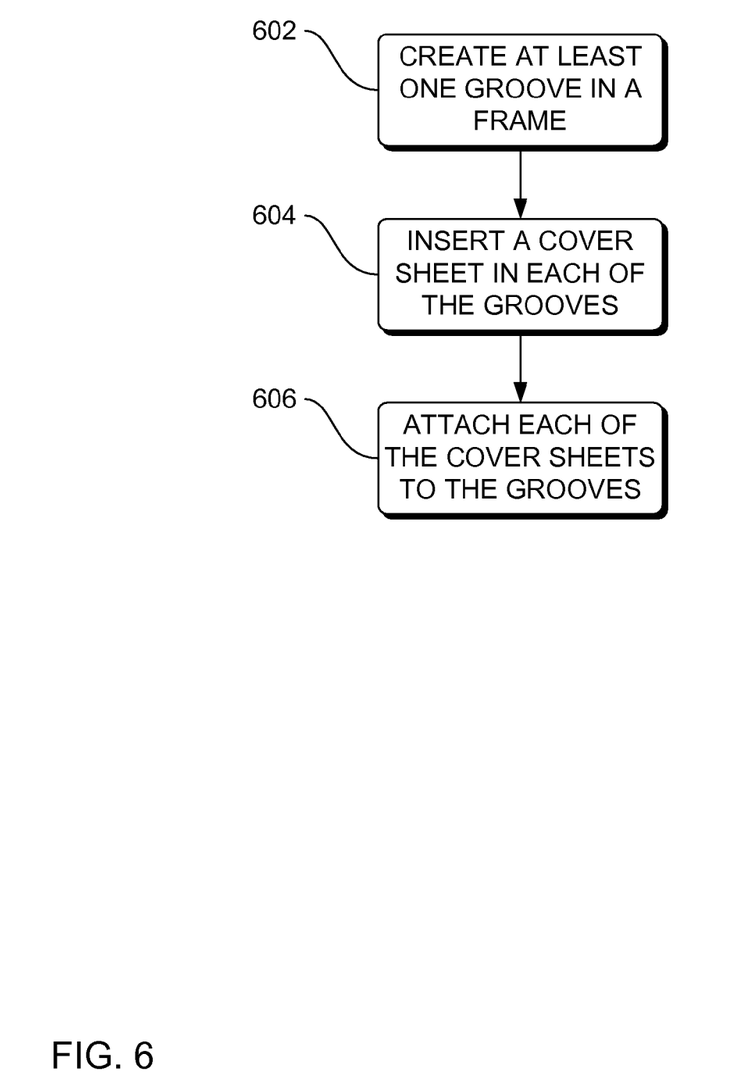
FIG. 6 is a flowchart of a method of manufacturing a cover assembly of a according to an implementation.

FIG. 6 is a flowchart of a method 600 of manufacturing a cover assembly of a according to an implementation. Method 600 provides a cover assembly that is rugged and fairly simple to manufacture.

Method 600 includes creating a groove (e.g. 103 or 203) in an ABS X-ray imaging detector frame (e.g. 102), at block 602. The groove is reamed to accommodate the composite sheets (e.g. 104 and 202).

Method 600 includes inserting a cover sheet into each of the created grooves, at block 604. Method 600 also includes attaching the cover sheet(s) to the frame, at block 606, such as by applying adhesive between in the groove between the X-ray imaging detector frame and the cover sheet(s) or applying fasteners between the X-ray imaging detector frame and the cover sheet(s).

In some implementations of method 600, the attaching at block 606 is performed before the inserting at block 604. For example, glue is applied in the groove(s) and then the cover sheet(s) are inserted into the groove(s).

Conclusion

An X-ray imaging detector cover assembly is described. Although specific implementations are illustrated and described herein, it will be appreciated by those of ordinary skill in the art that any arrangement which is calculated to achieve the same purpose may be substituted for the specific implementations shown. This application is intended to cover any adaptations or variations.

In particular, one of skill in the art will readily appreciate that the names of the methods and apparatus are not intended to limit implementations. Furthermore, additional methods and apparatus can be added to the components, functions can be rearranged among the components, and new components to correspond to future enhancements and physical devices used in implementations can be introduced without departing from the scope of implementations. One of skill in the art will readily recognize that implementations are applicable to future X-ray imaging detectors, different X-ray imaging detector frames, and new cover sheets.

The terminology used in this application is meant to include all X-ray imaging detectors, X-ray imaging detector frames, and cover sheets and alternate technologies which provide the same functionality as described herein.

I claim:

1. An apparatus comprising:
   an X-ray imaging detector frame having at least two grooves, the X-ray imaging detector frame having a right-angled "U" geometry;
   at least two cover sheets, each of the at least two cover sheets having two faces and four sides;
   padding attached to a face of each of the two cover sheets;
   a pin along an axis that is perpendicular to the cover sheets, the pin bisecting the X-ray imaging detector frame near an end of the X-ray imaging detector frame; and
   a retainer that is rotatably attached to the X-ray imaging detector frame through the pin,
   wherein one of the sides of each of the at least two cover sheets are placed in one of the at least two grooves of the X-ray imaging detector frame,
   wherein the padding on each of the covers has a thickness that is about equal to a distance that the cover sheet is from an outer edge of the X-ray imaging detector frame to the extent that the outer edge of the padding is about in a same plane as the outer edge of the X-ray imaging detector frame.

2. The apparatus of claim 1, wherein the faces of each of the at least two cover sheets are attached to the X-ray imaging detector frame.

3. The apparatus of claim 1, wherein one of the sides of the at least two cover sheets is attached to the X-ray imaging detector frame.

4. The apparatus of claim 1, wherein each of the at least two grooves has a width about equal to the thickness of the each of the at least two cover sheets and each of the at least two cover sheets is attached to the X-ray imaging detector frame in one of the grooves of the X-ray imaging detector frame.

5. The apparatus of claim 1, wherein the at least two cover sheets further comprises two cover sheets, each cover sheet having an equal thickness, the at least two grooves further comprise two grooves, each of the two grooves having a width about equal to the thickness of the each of two cover sheets and each of the at least two cover sheets is attached to the X-ray imaging detector frame in one of the two grooves of the X-ray imaging detector frame.

6. The apparatus of claim 5, wherein the two cover sheets are spaced apart from each other at a distance about the thickness of the X-ray imaging detector.

7. The apparatus of claim 1, wherein the X-ray imaging detector frame further comprises:
   acrylonitrile butadiene styrene.

8. The apparatus of claim 1, wherein the at least two cover sheets further comprises:
   a composite material.

9. The apparatus of claim 1, wherein the X-ray imaging detector frame further comprises a material other than the material of the cover sheet.

10. The apparatus of claim 1, wherein the X-ray imaging detector frame further comprises:
    four portions forming a right-angled quadrilateral geometry.

11. An apparatus comprising:
    an X-ray imaging detector frame;
    at least two cover sheets, wherein each of the cover sheets having two opposing faces;
    padding attached to a face of each of the two cover sheets; and
    a pin along an axis that is perpendicular to the cover sheets, the pin bisecting the X-ray imaging detector frame near an end of the X-ray imaging detector frame,
    wherein each of the two opposing faces of each of the at least two cover sheets are attached to the X-ray imaging detector frame,
    wherein the padding on each of the covers has a thickness that is about equal to a distance that the cover sheet is from an outer edge of the X-ray imaging detector frame to the extent that the outer edge of the padding is about in a same plane as the outer edge of the X-ray imaging detector frame.

12. The apparatus of claim 11, wherein the at least two cover sheets further comprises:
    two cover sheets, each of the two cover sheets having two opposing faces.

13. The apparatus of claim 11, wherein one of the sides of the at least two cover sheets is attached to the X-ray imaging detector frame.

14. The apparatus of claim 11, wherein the at least two cover sheets further comprises two cover sheets, each of the two cover sheets having an equal thickness, the X-ray imaging detector frame further comprises two grooves, each groove having a width about equal to the thickness of the each of the two cover sheets and each of the two cover sheets is attached to the X-ray imaging detector frame in one of the two grooves of the X-ray imaging detector frame.

15. The apparatus of claim 11, wherein the X-ray imaging detector frame further comprises a material other than the material of the cover sheet.

16. An X-ray imaging detector cover assembly comprising:
    an X-ray imaging detector frame having four portions that form a right-angled quadrilateral geometry, the inner perimeter of at least two of the four portions having two parallel grooves, the grooves having a width;
    padding attached to a face of each of the two cover sheets;
    two cover sheets, each cover sheet having two faces and four sides, the cover sheets having a thickness about equal to the width of the grooves, each of the two cover sheets being attached to the X-ray imaging detector frame in one of the grooves of the X-ray imaging detector frame, wherein the two cover sheets are spaced apart from each other at a distance about the thickness of an X-ray imaging detector; and
    a pin along an axis that is perpendicular to the cover sheets, the pin bisecting the X-ray imaging detector frame near an end of the X-ray imaging detector frame,
    wherein both of the faces of both of the two cover sheets are attached to the X-ray imaging detector frame,
    wherein the padding on each of the covers has a thickness that is about equal to a distance that the cover sheet is from an outer edge of the X-ray imaging detector frame to the extent that the outer edge of the padding is about in a same plane as the outer edge of the X-ray imaging detector frame.

17. The X-ray imaging detector cover assembly of claim 16, wherein the padding has a thickness that is about equal to a distance that each of the cover sheets is from an outer edge of the X-ray imaging detector frame to the extent that the outer edge of the padding is about in a same plane as the outer edge of the X-ray imaging detector frame.

* * * * *